(12) United States Patent
Yamashita et al.

(10) Patent No.: US 6,539,202 B1
(45) Date of Patent: Mar. 25, 2003

(54) INTERFERENCE CANCELING DEVICE

(75) Inventors: Kazuo Yamashita, Mitaka (JP); Hironori Sakamoto, Mitaka (JP); Tomohiro Sanpei, Mitaka (JP); Tamaki Honda, Mitaka (JP); Hiroshi Morita, Mitaka (JP)

(73) Assignee: Japan Radio Co., Ltd., Tokyo (JP)

( * ) Notice: Subject to any disclaimer, the term of this patent is extended or adjusted under 35 U.S.C. 154(b) by 0 days.

(21) Appl. No.: 09/448,057

(22) Filed: Nov. 23, 1999

(30) Foreign Application Priority Data

Dec. 8, 1998 (JP) ........................................... 10-348462

(51) Int. Cl.[7] ............................................. H04B 15/00
(52) U.S. Cl. ........................ 455/24; 455/278.1; 455/307
(58) Field of Search ........................ 455/296, 63, 67.3, 455/24, 25, 278.1, 307; 370/310, 342, 464; 375/295, 296

(56) References Cited

U.S. PATENT DOCUMENTS

| 5,596,600 A | * | 1/1997 | Dimos et al. | ............... 370/208 |
| 5,826,181 A | * | 10/1998 | Reed | ........................... 329/327 |
| 6,215,812 B1 | * | 4/2001 | Young et al. | ............... 375/144 |
| 6,259,688 B1 | * | 7/2001 | Schilling et al. | ........... 370/342 |
| 6,373,909 B2 | * | 4/2002 | Lindquist et al. | .......... 375/343 |

FOREIGN PATENT DOCUMENTS

| JP | 60-253325 | 12/1985 |
| JP | 63-73620 | 6/1988 |

* cited by examiner

*Primary Examiner*—Thanh Cong Le
*Assistant Examiner*—Tsu Leun Lei
(74) *Attorney, Agent, or Firm*—Samuels, Gauthier & Stevens, LLP

(57) ABSTRACT

An interference canceling device comprising a flat phase IF narrow band BPF. A signal which has been branched from a signal on the main line is filtered by the BPF and is recombined with the signal on the main line. Phase rotation caused by frequency separation from the pass band center frequency does not occur because the phase characteristics of the BPF are substantially flat in the pass band. Thus, interference existing not only in a pin-point frequency, but over a band of frequencies can be cancelled.

8 Claims, 13 Drawing Sheets

PIN-POINT CANCELLATION CHARACTERISTICS
DUE TO GRADIENT OF PHASE

INTERFERENCE CANCELING DEVICE

BACKGROUND OF THE INVENTION

1) Field of the Invention

The present invention relates to an interference canceling device used in a receiver for mobile communication or the like.

2) Description of Related Art

In mobile communications, both FDD (Frequency Division Duplex) systems and CDMA (Code Division Multiple Access) systems are employed. In the FDD system, it is possible to prevent the effects of interference by selecting frequency channels so as to exclude frequencies in which interference exits. In the CDMA system, however, because this system uses a broad frequency band for signal transmission, there is no means effective other than providing an interference canceling device within a receiver to directly eliminate interference.

FIG. 10 illustrates an example of an interference canceling device, which comprises a canceling circuit 10 provided in a main line 12. The canceling circuit 10 consists of M notch filters 14-i (M: a natural number larger than 2; and i: 1, 2, . . . M) connected in cascade.

Each notch filter 14-i at the i-th stage comprises a local oscillator 16 oscillating at a frequency which differs from the oscillation frequencies of local oscillators in other stages, a mixer (MIX) 18 for mixing a signal on the main line 12 (hereinafter referred to as "main signal") with the oscillation output from the local oscillator 16 to convert it to a signal having a lower intermediate frequency (IF), an IF notch filter 20 for filtering the IF output from the MIX 18, and a mixer MIX 22 for mixing the filtered output from the IF notch filter 20 with the oscillation output from the local oscillator 16 to revert it to a signal having the original radio frequency (RF).

The IF notch filter 20 in the notch filter 14-i is configured to eliminate specific frequency components from a main signal which has been converted into an IF. The frequency to be eliminated is fixed to an identical value for all the IF notch filters at every stage.

Further, the frequency band in which interference is considered to exist has a certain width. Therefore, in order to cover this band, the frequency at which the local oscillator of each stage oscillates is set to differ from one stage to another by an appropriate amount. It is possible to eliminate interference with regard to a frequency band having a certain width, by thus setting the oscillating frequency value of each oscillator in accordance with frequencies considered to include interference, and also with appropriate differences.

However, the device shown in FIG. 10 has certain drawbacks. Among these, the canceling circuit 10 is provided on the main line 12. Accordingly, when insertion loss and delay occurring in the canceling circuit 10 is large, a noise figure NF of the main signal output deteriorates and also adaptability over the whole system is lost. This problem is especially notable when the number of stages M of the notch filters is large. Also, in the device shown in FIG. 10, down conversion from RF to IF and up conversion from IF to RF are executed so as to facilitate signal processing. At the time of these conversions, noise generated at the local oscillator 16 is added to the main signal, and also distortion introduced at MIXs 18 and 22 is influential in deteriorating the channel quality.

To solve the above problems, it is appropriate to displace a canceling circuit 10A from the main line 12, as shown in FIG. 11. In the canceling circuit 10A, a signal which has been branched from a main signal by means of a directional coupler 24 is converted into a signal having an IF by the local oscillator 16 and the MIX 18, and is then filtered by an IF narrow band BPF 20A to extract frequency components in which interference is considered to exist. The filtered output from the IF narrow band BPF 20A is further converted into a signal having an RF by the MIX 22. Of the outputs from the MIX 22, sum frequency components, namely frequency components corresponding to those of a main signal are recombined, as a cancellation signal, with the main signal by a directional coupler 28. Further, at the time of this recombining, a control circuit 30 uses a directional coupler 32 to detect amplitude and phase of the main signal or detect whether or not there are signals at specific frequencies. On the basis of the detection result, phase shift and gain in a variable phase shifter 34 and a variable gain amplifier 36, respectively, are controlled such that at the specific frequencies, namely at frequencies including interference, the cancellation signal has an amplitude which is of the same level as that of the main signal and a phase which is opposite to that of the main signal. In this device, the aforementioned problems, such as quality deterioration of a main signal found in the device of FIG. 10, does not occur.

However, in the device shown in FIG. 11 a drawback remains in that a frequency band for interference elimination is much narrower than that in the device of FIG. 10. Specifically, the IF narrow band BPF 20A usually represents band pass characteristics in the vicinity of its pass band center frequency f0, as depicted in FIGS. 12A to 12C. In particular, phase characteristics have a certain gradient, as shown in FIG. 12C. Therefore, even if the aforementioned automatic control is executed in the circuit of FIG. 11 by the variable phase shifter 34 and the variable gain amplifier 36, phases of the cancellation signal and of the interference match only at one point in frequency (e.g., at f0) as shown in FIG. 13, and this leads to deterioration of cancellation characteristics due to phase rotation caused by frequency separation from the frequency f0. It is therefore difficult, or even impossible, to eliminate interference spreading over a frequency band having a certain width, for example, a frequency modulated wave, with such "pin-point" cancellation characteristics.

SUMMARY OF THE INVENTION

It is therefore an object of the present invention to overcome disadvantageous pin-point cancellation characteristics in the prior art, thereby allowing sufficient cancellation of interference spreading in a frequency band having a certain width. In the present invention, this object is achieved by improving the configuration of a narrow band BPF constituting a canceling circuit.

In the present invention, the narrow band BPF in the canceling circuit is configured such that it represents substantially flat phase characteristics in a specific frequency band having a certain width. A signal which has been branched from a main signal is filtered by this narrow band BPF to generate a cancellation signal in such a manner that a relation of "substantially the same amplitude level and opposite phases" can be established between the main signal and the cancellation signal over the entire range of the above-mentioned specific frequency band. Accordingly, within the above-mentioned specific frequency band, phase rotation of a cancellation signal caused by separation from the specific frequency can be eliminated (or can be suppressed to a level which can be substantially disregarded), thereby solving a problem in the prior art resulting from such phase rotation. In other words, the present invention enables elimination of interference ranging over a frequency band having a certain width, for example, a frequency modulated wave.

A narrow band BPF having flat phase characteristics, which is one feature of the present invention, can be implemented as a filter comprising, for example, a plurality of signal paths having filtering characteristics different from one another; distribution means for distributing signals which have been branched from a main signal to the signal paths; and combining means for combining the outputs from the signal paths to generate a filtered output. For example, a narrow band BPF having a substantially flat phase characteristics can be obtained relatively easily by providing a main signal path having predetermined filtering characteristics and a delay signal path having a greater delay than that of the main signal path, signal attenuation of the delay path being set in accordance with the delay ratio of the two paths. The main signal path and the delay signal path may pass through separate circuits (namely, parallel paths) over the whole configuration, or may share a part (a filter of the like) of the configuration.

Further, it may be preferable to provide a plurality of canceling circuits having the above-mentioned specific frequency bands set to differ from one another, such that they are parallel to one another, when seen from the main line via main line signal branching means and main line signal recombining means such as directional couplers or the like. This configuration enables interference elimination over a plurality of frequency bands. In particular, because the present invention expands the range of interference elimination from a pin-point frequency as in the conventional art to a specific frequency band having a certain width, provision of such a plurality of canceling circuits has a great significance.

It may also be preferable to provide a plurality of canceling circuits having substantially the same specific frequency band or having specific frequency bands different from one another, such that they are connected in series with one another as seen from the main line via main line signal branching means and main line signal recombining means such as directional couplers or the like. This configuration allows operation such as for selectively activating the plurality of canceling circuits. Namely, it is possible to activate only one canceling circuit when interference is weak while activating all the circuits when interference is strong. Thus, interference cancellation can be easily executed over a range from weak interference to strong interference. It is to be noted that a canceling circuit at each stage may comprise a single circuit or a group of canceling circuits connected as described in the previous paragraph.

BRIEF DESCRIPTION OF THE DRAWINGS

These and other objects of the invention will be explained in the description below with reference to the accompanying drawings, in which:

FIG. 4A shows amplitude characteristics, FIG. 4B shows delay characteristics, and FIG. 4C shows phase characteristics;

FIG. 5A shows amplitude characteristics, FIG. 5B shows delay characteristics, and FIG. 5C shows phase characteristics;

FIG. 6A shows amplitude characteristics, FIG. 6B shows delay characteristics, and FIG. 6C shows phase characteristics;

FIG. 12A shows amplitude characteristics, FIG. 12B shows delay characteristics, and FIG. 12C shows phase characteristics.

DETAILED DESCRIPTION OF THE PREFERRED EMBODIMENT

A preferred embodiment of the present invention will be described in further detail with reference to the accompanying drawings. It is to be noted that elements similar to or corresponding to those in FIGS. 10 to 13 are not further explained.

Figure 1:
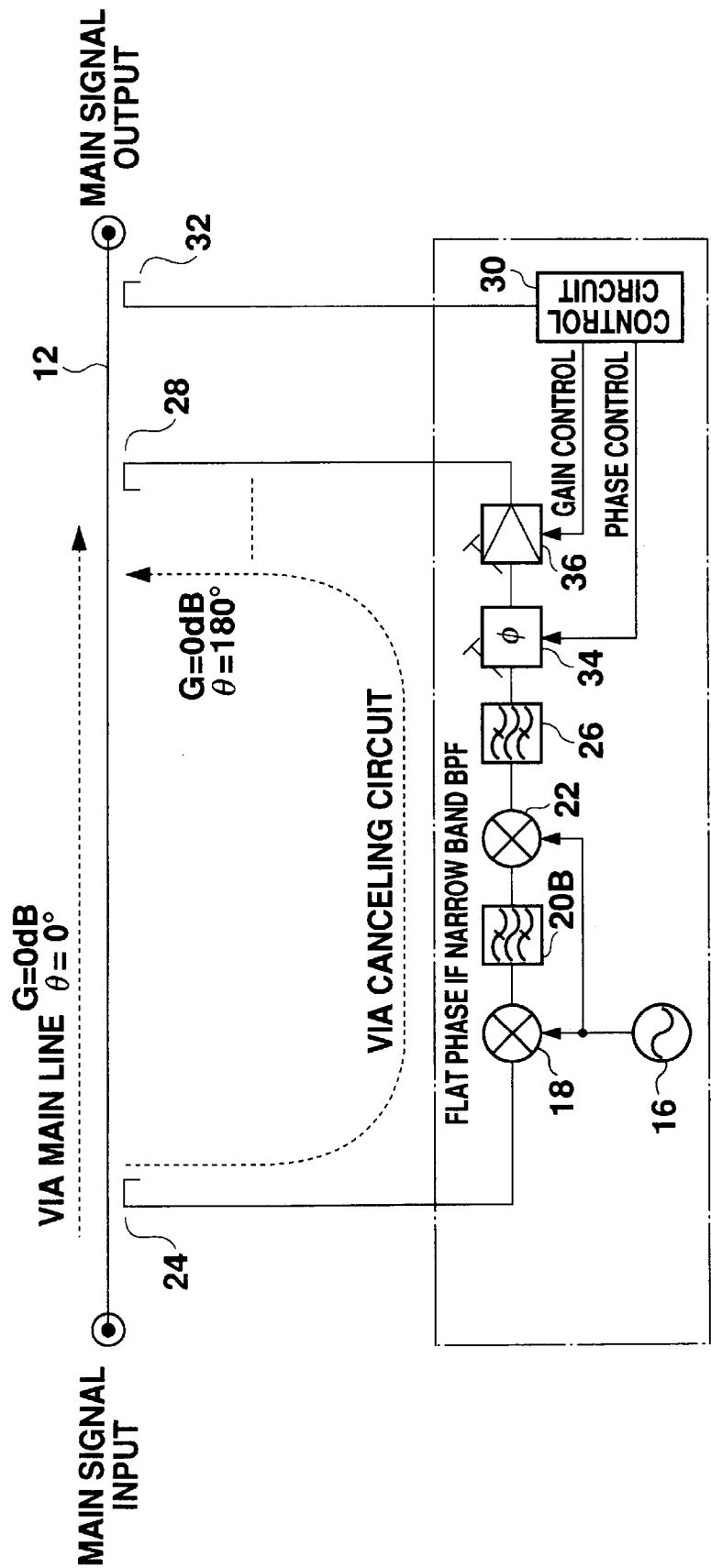
FIG. 1 is a block diagram showing an overall configuration of an interference canceling device according to one embodiment of the invention.

Referring to FIG. 1 there is depicted a configuration of an interference canceling device according to one embodiment of the present invention. The device shown in FIG. 1 comprises a canceling circuit 10B, which includes a flat phase IF narrow band BPF 20B substituted for the IF narrow band BPF 20A of FIG. 11.

Figure 2:
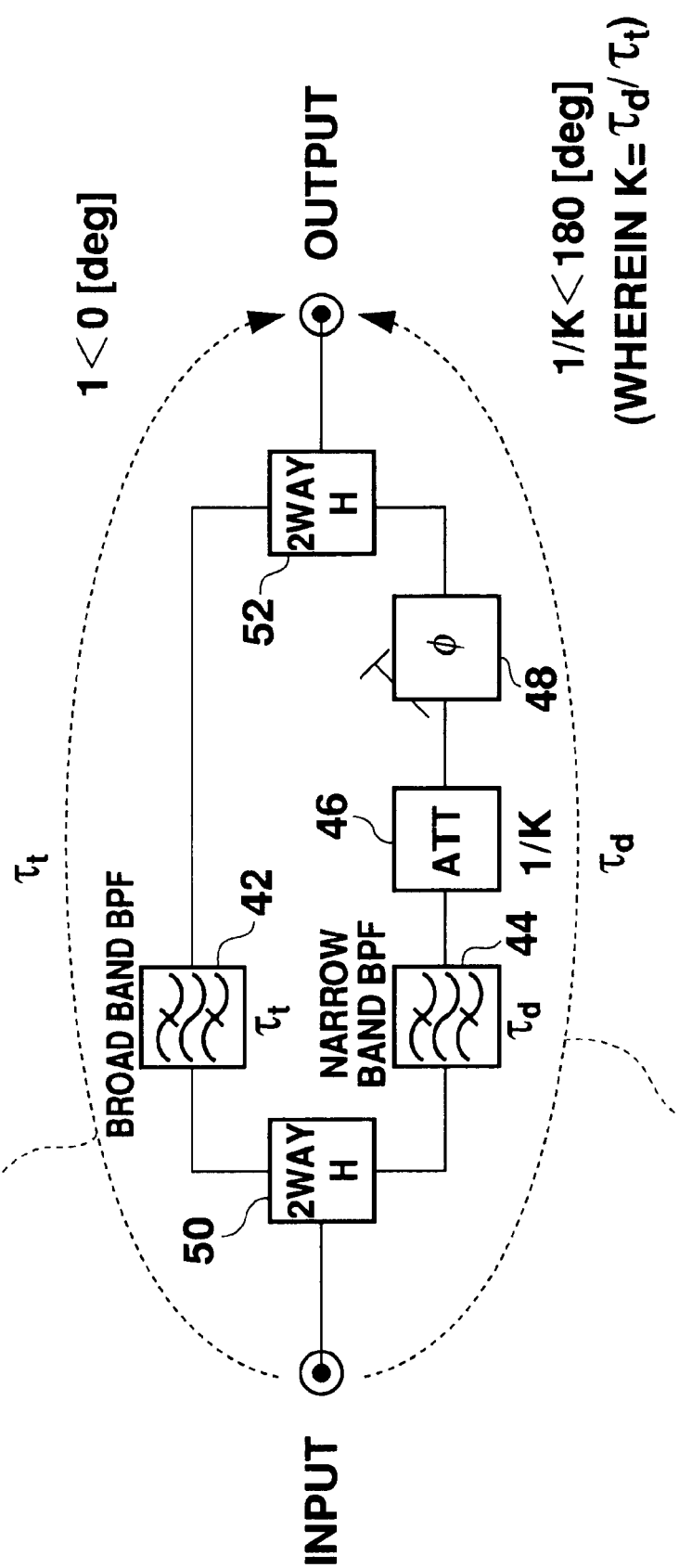
FIG. 2 is a block diagram showing one example of a configuration of an IF narrow band BPGF having flat phase characteristics according to the embodiment of the present invention.

The flat phase IF narrow band BPF 20B is configured, for example, such that two signal paths, namely a main signal path 38 and a delay path 40, are provided, as shown in FIG. 2. Provided on the main signal path 38 is a broad band BPF 42 whose pass band center frequency is f0 and delay is $\tau t$. Provided on the delay path 40 are a narrow band BPF 44 whose pass band center frequency is f0 and delay is $\tau d$ ($\tau d > \tau t$), an attenuator 46 whose attenuation is fixed to a value K ($K = \tau d/\tau t > 1$), and a phase shifter 48 whose phase shift is set such that a signal having a phase opposite to that of a signal transmitted via the main signal path 38 is obtained from the delay path 40.

Further, a two-way hybrid 50 distributes signals from the MIX 18 to the main signal path 38 and the delay path 40 such that they have signals having an equal amplitude and the same phase. On the other hand, a two-way hybrid 52 combines a signal transmitted via the main signal path 38 and a signal transmitted via the delay path 40 without causing change in the amplitude and the phase and supplies the signal to the MIX 22.

Figure 3:
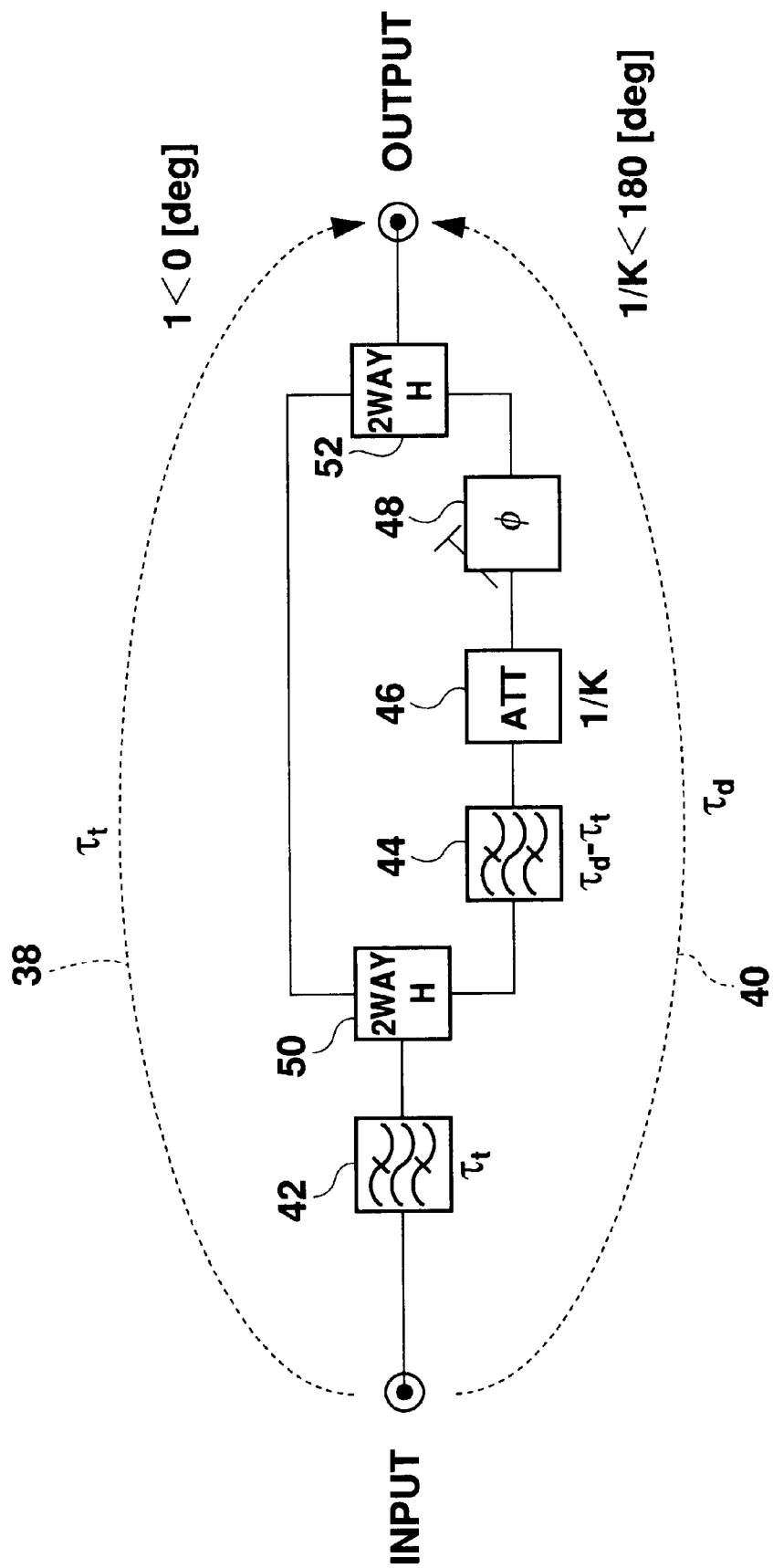
FIG. 3 is a block diagram showing another example of a configuration of an IF narrow band BPGF having flat phase characteristics according to the embodiment of the present invention.

It is to be noted that the broad band BPF 42 may be provided before the two-way hybrid 50, as shown in FIG. 3, thereby setting delay of the narrow band BPF 44 to τd–τt. Specifically, the broad band BPF 42 may be shared by the main signal path 38 and the delay path 40.

Figure 4A:
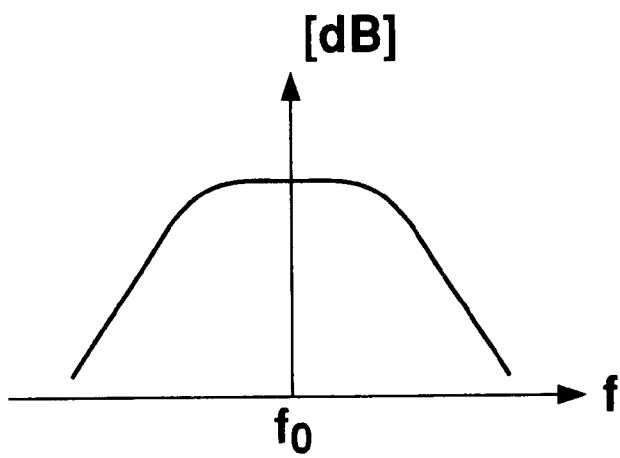
FIGS. 4A, 4B and 4C show filtering characteristics of a main signal path, and in particular.
Figure 4B:
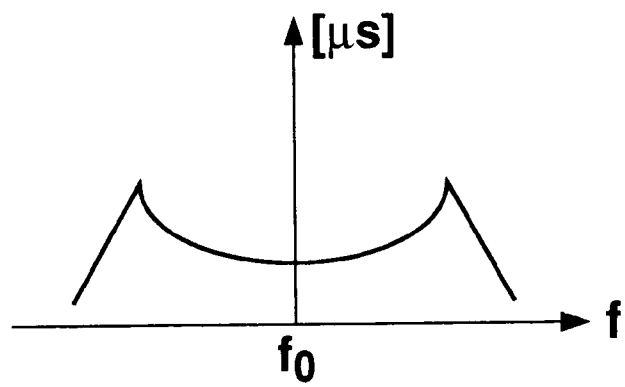
Figure 4C:
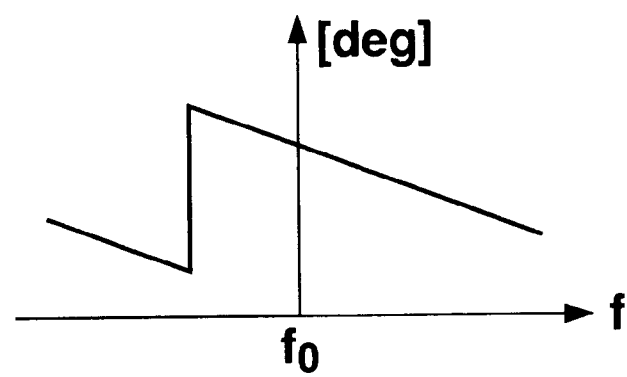
Figure 5A:
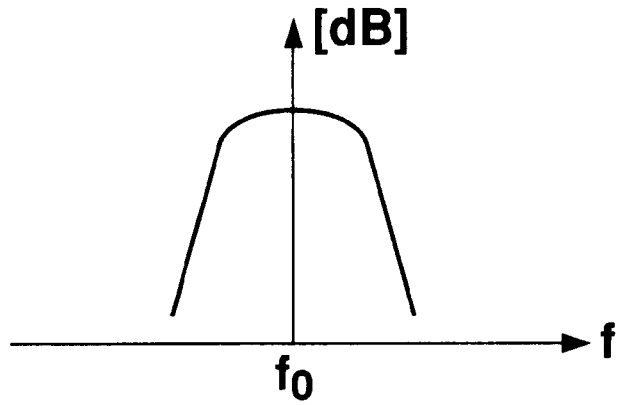
FIGS. 5A, 5B and 5C show filtering characteristics of a delay signal path, and in particular.
Figure 5B:
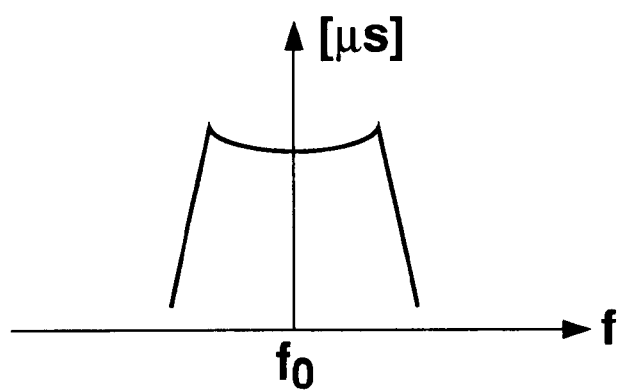
Figure 5C:
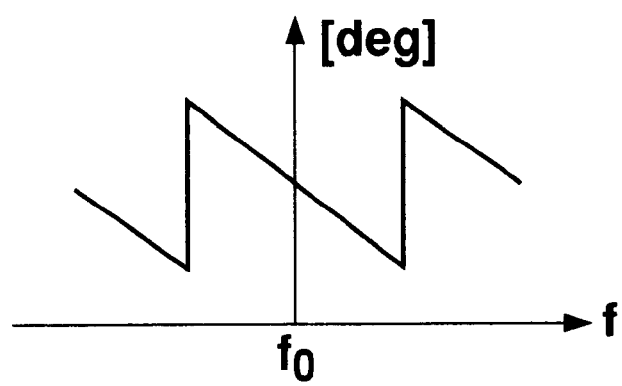
Figure 6A:
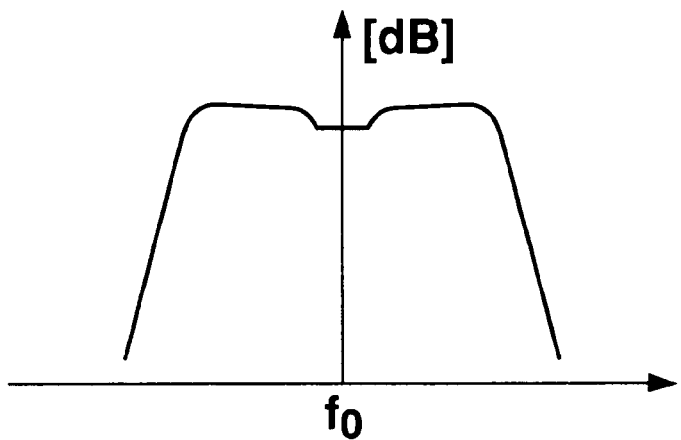
FIGS. 6A, 6B and 6C show combined filtering characteristics of a main signal path and a delay signal path, and in particular.
Figure 6B:
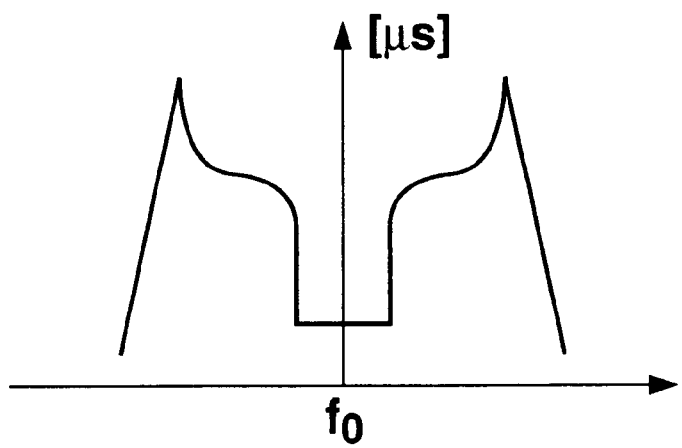
Figure 6C:
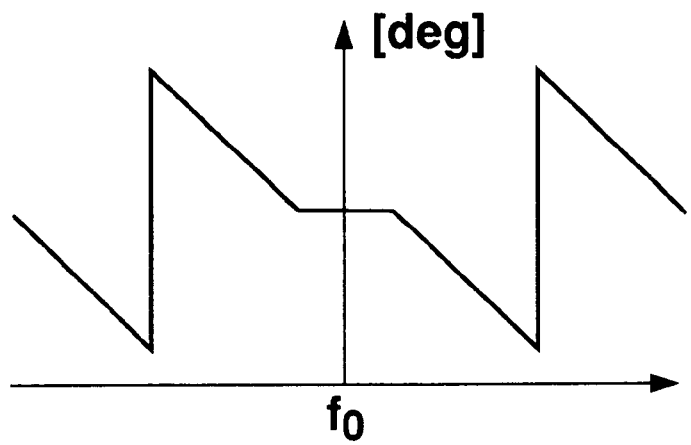
Figure 7:
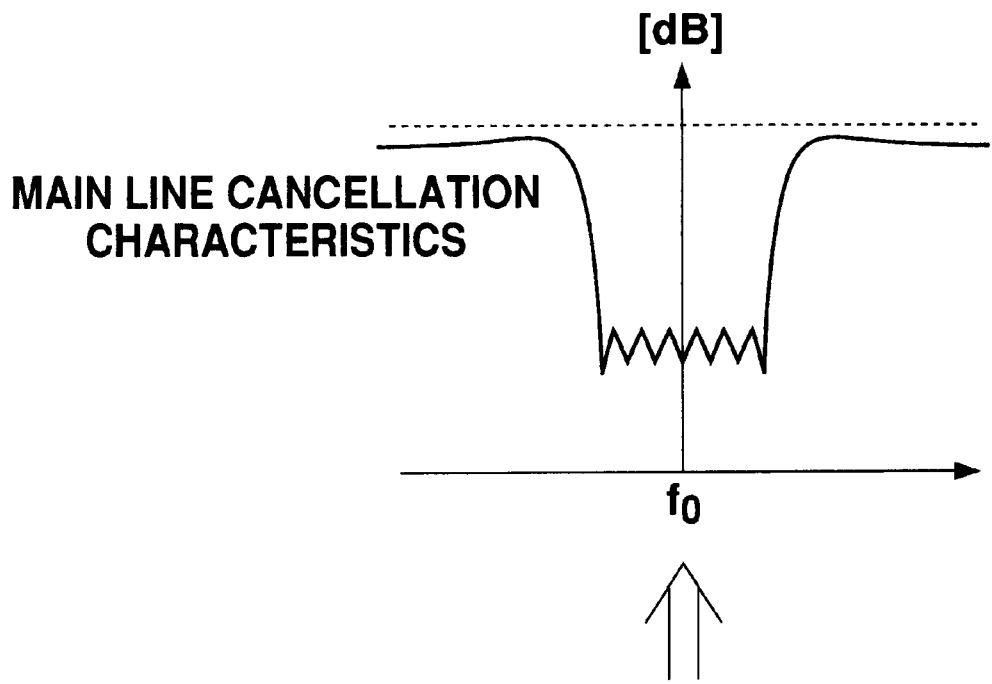
FIG. 7 shows cancellation characteristics according to the embodiment of the present invention.

FIGS. 4A to 4C show filtering characteristics of the main signal path 38 and FIGS. 5A to 5C show filtering characteristics of the delay path 40. The filtering characteristics of the main signal path 38, determined mainly by filtering characteristics of the broad band BPF 42, have phase characteristics representing a relatively gentle gradient, as shown in FIG. 4C. On the other hand, the filtering characteristics of the delay path 40, determined mainly by those of the narrow band BPF 44, have phase characteristics representing a relatively steep gradient, as shown in FIG. 5C. Further, filtering characteristics of the whole IF narrow band BPF 20A depicted in FIG. 2 or 3 have phase characteristics representing a flat portion in the vicinity of frequency f0, as shown in FIG. 6C, according to the principle described later. Since the canceling circuit 10B comprises the IF narrow band BPF 20A having the aforementioned characteristics, namely, flat phase characteristics, it is possible, according to this embodiment, to attain cancellation characteristics having a certain width of band as shown in FIG. 7 and to sufficiently cancel a frequency modulated wave and other interference.

Figure 8:
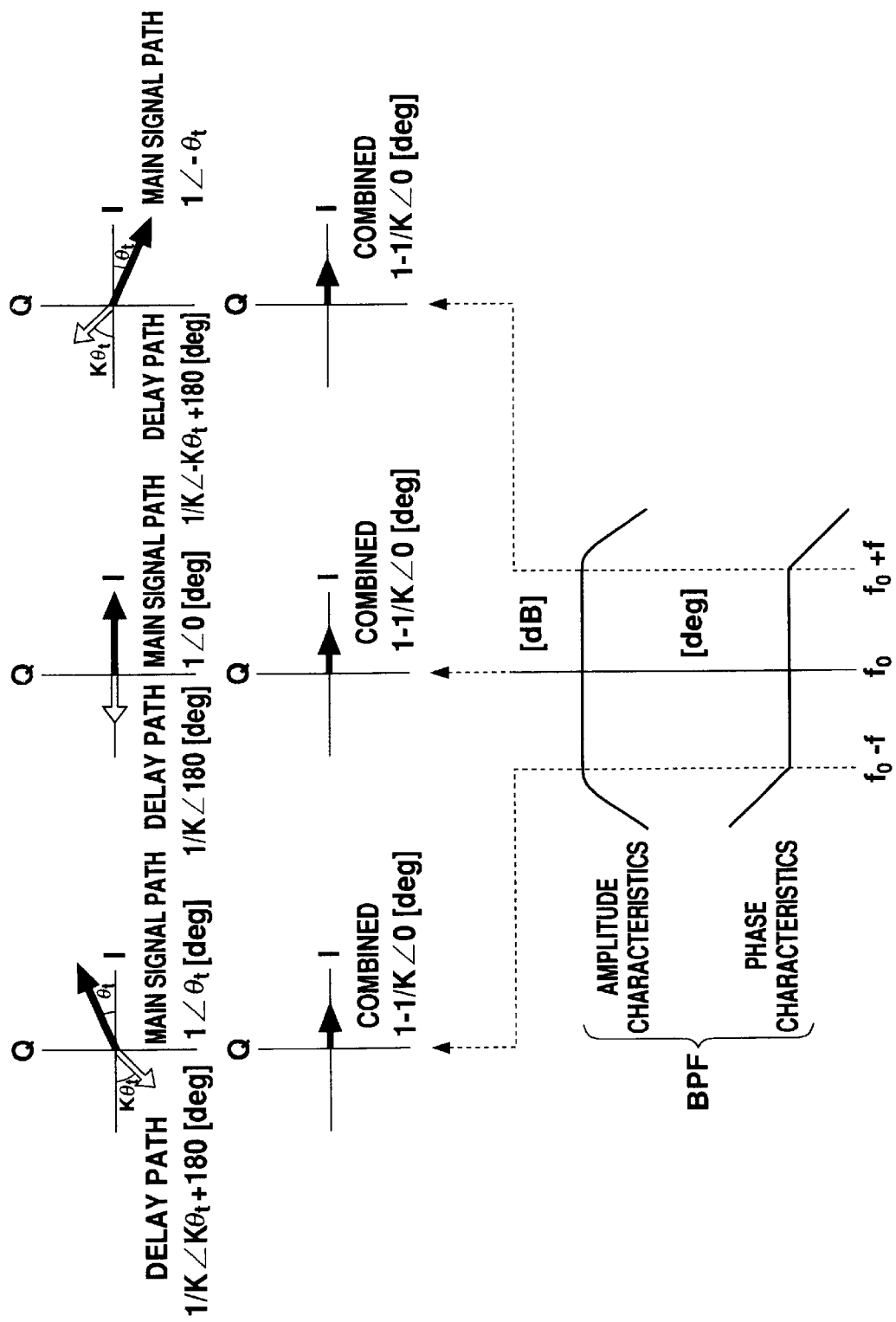
FIG. 8 shows a principle of phase flattening according to the embodiment of the present invention.

Referring now to FIG. 8, a phase flattening principle according to this embodiment will be described. For ease of explanation, the amplitude of an output from the main signal path 38 is set as a reference, namely to 1, and the phase of a output from the main signal path 38 at frequency f0 is set as a reference, namely to 0 (deg) (see upper middle portion of FIG. 8). Since the main signal path 38 has phase characteristics representing a linear gradient as shown in FIG. 4, the phase of an output from the main signal path 38 is rotated by θt in accordance with a separation width f, at frequencies f0±f which are separated from frequency f0 by ±f (see upper right and left portion of FIG. 8). The phase rotation amount θt is determined according to θt=2πf·τt.

Further, assume that a phase shift in the delay path 40 at frequency f0 is an ideal value, namely 180 (deg) (see upper middle of FIG. 8). Since the delay path 40 has phase characteristics representing a linear gradient as shown in FIG. 5, the phase of an output from the delay path 40 is rotated by θd in accordance with a separation width f, at frequencies f0±f (see upper right and left portion of FIG. 8). The phase rotation amount θd is determined according to θd=2πf·τd, which can be expressed as θd=2πf·K·τt=K·θt using a delay ratio K=τd/τt.

Therefore, at frequencies f0±f, the following are found:

output amplitude of main signal path 38=cos(θt)

output amplitude of delay path 40=Ad·cos·(K·θt−180 (deg))

=−Ad·cos·(K·θt)

wherein Ad is gain of the delay path 40.
From the above, the output amplitude of the flat phase IF narrow band BPF 20B at frequencies f0±f is found as follows:

cos(θt)−Ad·cos·(K·θt)

In order to flatten the phase characteristics of a signal given in this expression, the following may be obtained:

Ad=sin(θt)/sin(K·θt)

However, implementation of Ad as in the above expression would necessitate a large scale circuit. Therefore, in this embodiment, the following approximate expression is substituted into the above expression:

Ad=1/K, wherein −90 (deg)<(K·θt)<90 (deg), (K·θt)≠0.

Namely, in this embodiment, the attenuator 46 whose signal attenuation ratio is fixed to a value K is provided. In other words, as shown in the middle of FIG. 8, the delay path 40 is provided with the attenuator 46 and also delays are set to τt and τd, such that phase rotation generated in the main signal path 38 can be cancelled by phase rotation and signal attenuation in the delay path 40.

It should be noted that the greater is the separation from frequency f0, the more the approximation accuracy in the above approximate expression deteriorates. More specifically, the accuracy changes as follows:

When θt=±5 (deg), amplitude accuracy is ±0.8%, and phase accuracy is ±0.0 (deg);

When θt=±10 (deg), amplitude accuracy is ±3.0%, and phase accuracy is ±0.2 (deg); and When θt=±15 (deg), amplitude accuracy is ±6.4%, and phase accuracy is ±0.8 (deg).

Figure 9:
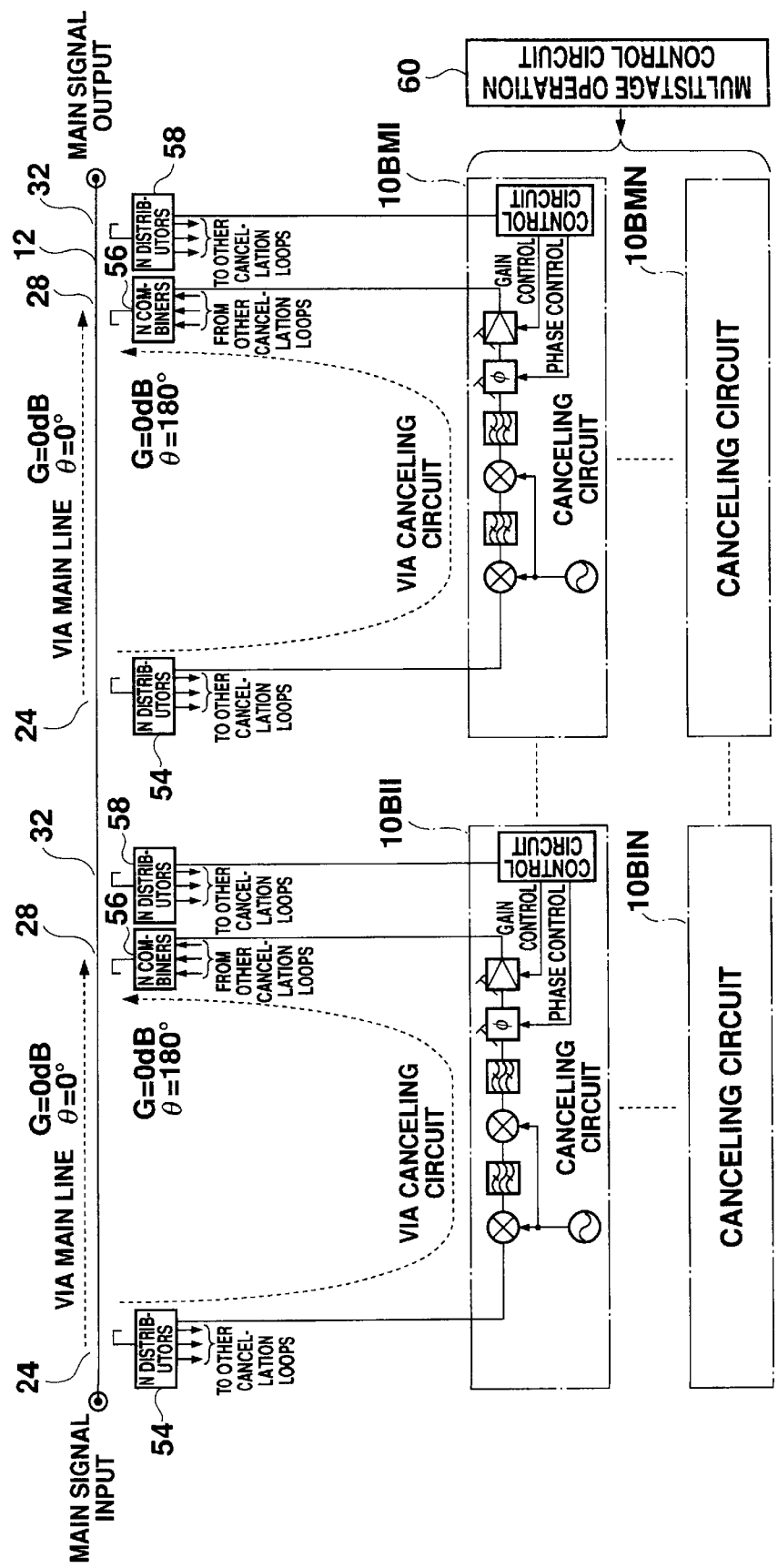
FIG. 9 shows an application example according to the embodiment of the present invention.
Figure 10:
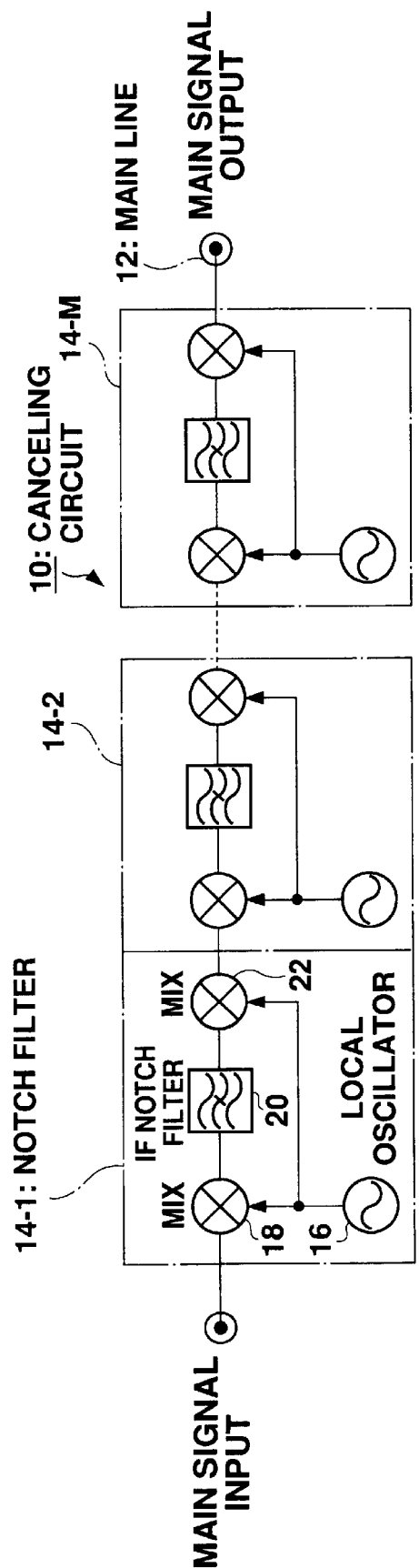
FIG. 10 is a block diagram showing an example of prior art.
Figure 11:
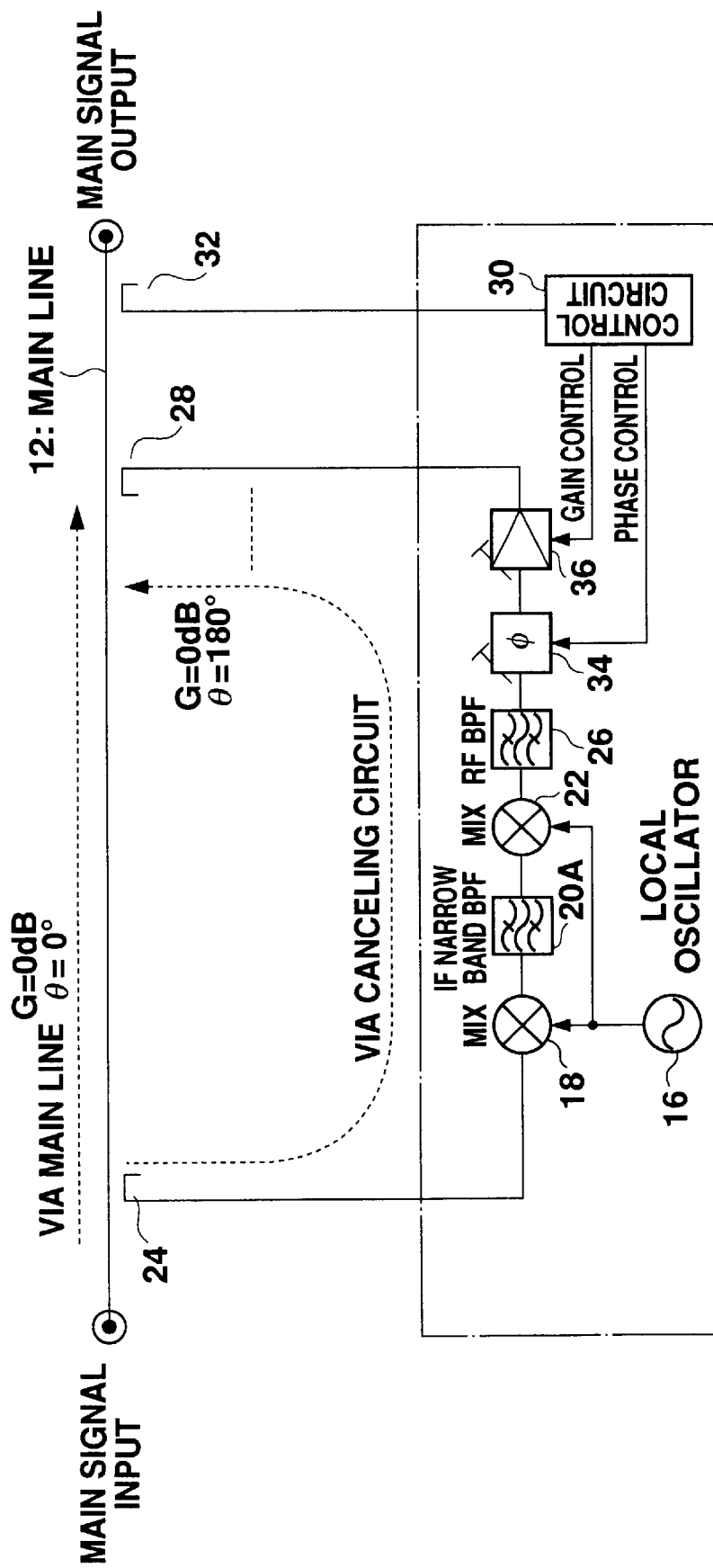
FIG. 11 is a block diagram showing another example of prior art.
Figure 12A:
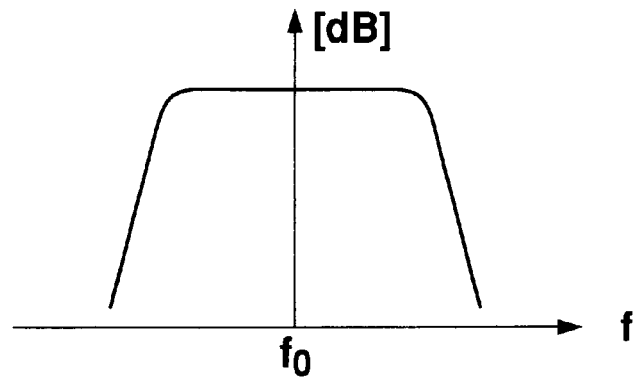
FIGS. 12A, 12B and 12C show filtering characteristics of the prior art shown in FIG. 11, and in particular.
Figure 12B:
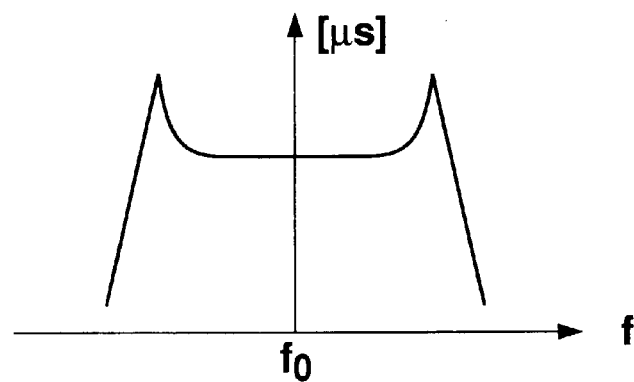
Figure 12C:
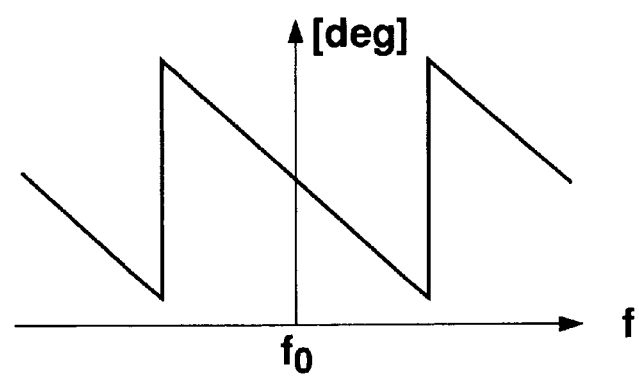
Figure 13:
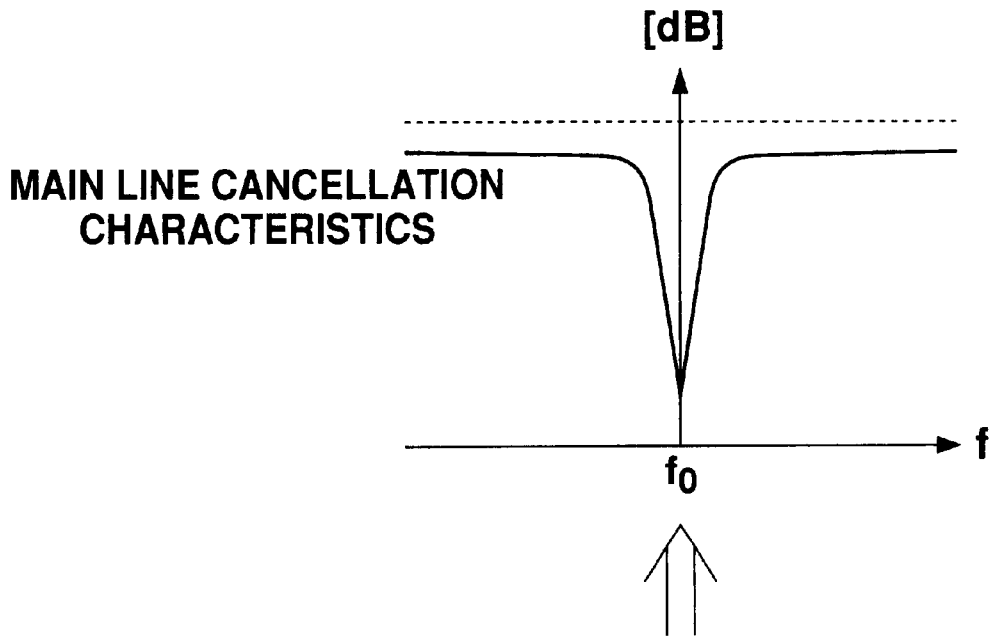
FIG. 13 shows cancellation characteristics of the prior art shown in FIG. 11.

FIG. 9 shows an application example of this embodiment. As shown in FIG. 9, N distributors 54 and 58 distribute signals which have been branched by means of common directional couplers 24 and 32 to canceling circuits 10Bi1, . . . 10BiN (i=1, 2, . . . M), whose outputs are combined by N combiners 56 and then coupled with a main signal by a common directional coupler 28. N canceling circuits to which the same N distributors 54 distribute signals may be configured to eliminate different frequency bands or the same frequency band. As described, this example, in combination with an advantage of band expansion in this embodiment, can advantageously further expand a frequency band over which interference can be cancelled.

In this example, M stages of the above-mentioned canceling circuits are further connected in series with one another along the main line 12, and they are selectively activated by a multistage operation control circuit 60 in accordance with the strength of interference. Therefore, according to this example, it is possible to activate only one circuit at one stage, for example, when interference is weak while activating the entire circuit at all M stages when interference is strong, whereby preferable cancellation can be executed of interference ranging from weak to strong. Here, a configuration may be also used which sets M>1 and N=1 and eliminates N distributors 54 and 58 and N combiners 56.

Although the CDMA system was used in the foregoing descriptions, the present invention is also applicable to other systems.

Further, while the preferred embodiment of the present invention has been described using specific terms, such description is for illustrative purposes only, and it is to be understood that changes and modifications may be made without departing from the spirit or scope of the appended claims.

What is claimed is:

1. An interference canceling device for canceling interference contained in a signal on a main line by recombining the signal on the main line with a cancellation signal, comprising:

main line signal branching means for branching part of a signal on the main line;

a canceling circuit for generating a cancellation signal from a signal which has been branched from the signal on the main line; and main line signal recombining means for recombining the signal on the main line with the cancellation signal;

said interference canceling device further comprising a narrow band BPF provided within said canceling circuit, said narrow band BPF representing substantially flat phase characteristics in a specific frequency band having a certain width;

wherein said cancellation signal is generated by filtering the signal which has been branched from the signal on the main line by said narrow band BPF.

2. An interference canceling device according to claim 1, wherein said narrow band BPF includes:

a plurality of signal paths having different filtering characteristics from one another;

distribution means for distributing signals which have been branched from the signal on the main line to said signal paths; and coupling means for coupling outputs from each of said signal paths to generate a filtered output; and wherein filtering characteristics of each of said signal paths are determined such that phase characteristics regarding said filtered output are substantially flat in said specific frequency band.

3. An interference canceling device according to claim 2, wherein one of said plurality of signal paths is a main signal path having a predetermined delay and at least one of the remaining signal paths is a delay path having a larger delay compared with that of the main signal path, and signal attenuation in the delay path is set according to delay ratio of the delay path relative to the main signal path, such that filtering characteristics of said canceling circuit represent substantially flat phase characteristics in the specific frequency band having a certain width.

4. An interference canceling device according to claim 3, wherein said canceling circuit comprises a filter shared by said main signal path and said delay path.

5. An interference canceling device according to claim 1 comprising:

a plurality of said canceling circuits having specific frequency bands set to differ from one another and being connected in parallel with one another as seen from the main line via said main line signal branching means and said main line signal recombining means.

6. An interference canceling device according to claim 1 comprising:

a plurality of said canceling circuits having specific frequency bands which are the same or different from one another and being connected in series with one another as seen from the main line via said main line signal branching means and said main line signal recombining means.

7. An interference canceling device according to claim 1 wherein said canceling circuit includes means for automatically controlling such that said cancellation signal has an amplitude which is of the same level as that of the main signal and a phase which is opposite to that of the main signal in the above-mentioned specific frequency band.

8. An interference canceling device according to claim 1 wherein said canceling circuit includes:

means for converting a signal which has been branched from the signal on the main line into a signal having lower frequency prior to generation of said cancellation signal; and means for reverting the generated cancellation signal into a signal having the original frequency.

* * * * *